United States Patent [19]

Wood

[11] 4,268,858
[45] May 19, 1981

[54] TV TRANSMISSION SYSTEM FOR LONG TOW CABLES

[75] Inventor: Kenneth E. Wood, Annapolis, Md.

[73] Assignee: Westinghouse Electric Corp., Pittsburgh, Pa.

[21] Appl. No.: 774,287

[22] Filed: Mar. 4, 1977

[51] Int. Cl.³ .................. H04N 7/10; H04N 7/18; H04N 5/30

[52] U.S. Cl. ........................... 358/86; 358/99; 358/108; 358/210; 455/3

[58] Field of Search ............ 358/86, 99, 108, 194, 358/210, 103, 149, 92; 325/144, 183, 37, 57, 63, 308, 309; 340/3 T, 4 B

[56] References Cited

U.S. PATENT DOCUMENTS

| | | | |
|---|---|---|---|
| 2,076,361 | 4/1937 | Beverage | 325/183 |
| 2,852,600 | 9/1958 | Jenkins, Jr. | 358/100 |
| 3,072,904 | 1/1963 | Yaffee | 343/227 |
| 3,099,913 | 8/1963 | Melton | 340/4 B |
| 3,275,745 | 9/1966 | Var | 358/92 |

OTHER PUBLICATIONS

Leo G. Sands, "Remote Control of Mobile Base Station" Jan.-1954, Radio-Elect.

Primary Examiner—Marc E. Bookbinder
Assistant Examiner—Edward L. Coles
Attorney, Agent, or Firm—D. Schron

[57] ABSTRACT

An underwater survey system where the existence of a large number of multiplex signals in conjunction with a relatively poor frequency response over a long tow cable, results in a situation where the transmission of a normal 30 frames per second TV picture is impossible. The invention describes a method of transmitting a reduced bandwidth TV system where the signals are modulated on a carrier and the lower sideband used. The large signal loss at the upper frequency is compensated by equalizers, which can result in objectionable interference, when the vehicle is close to the receiving end. A remotely controlled carrier is used to minimize this interference.

12 Claims, 20 Drawing Figures

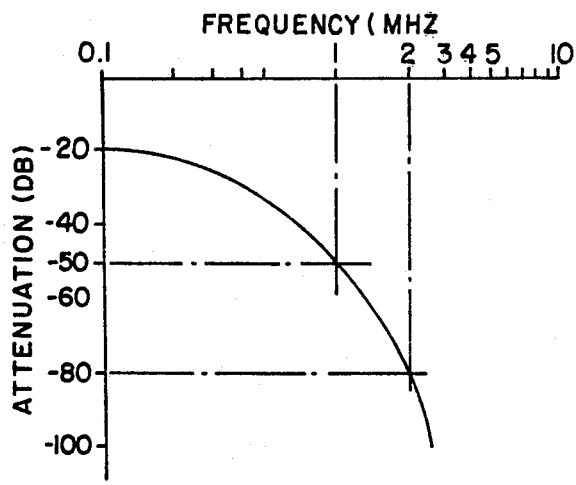
FIG. 3
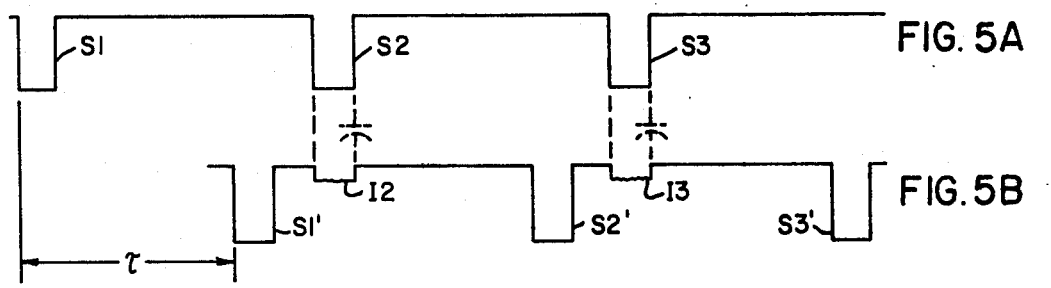
FIG. 5A
FIG. 5B
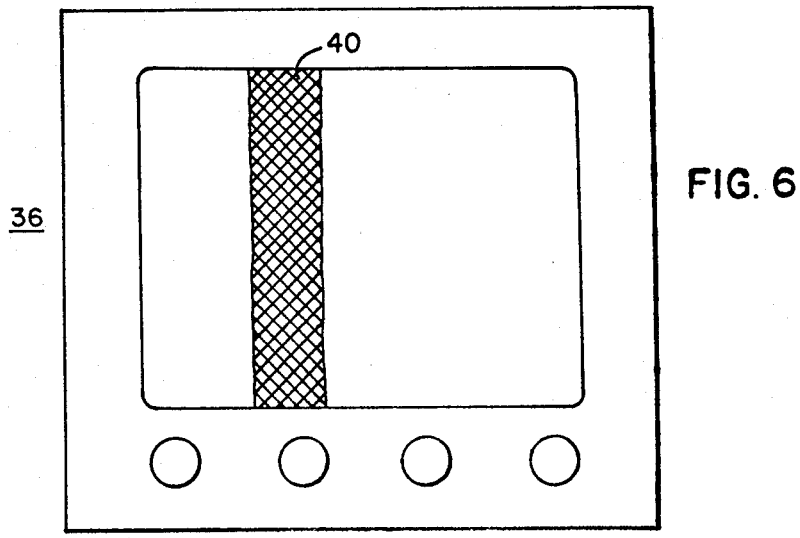
FIG. 6

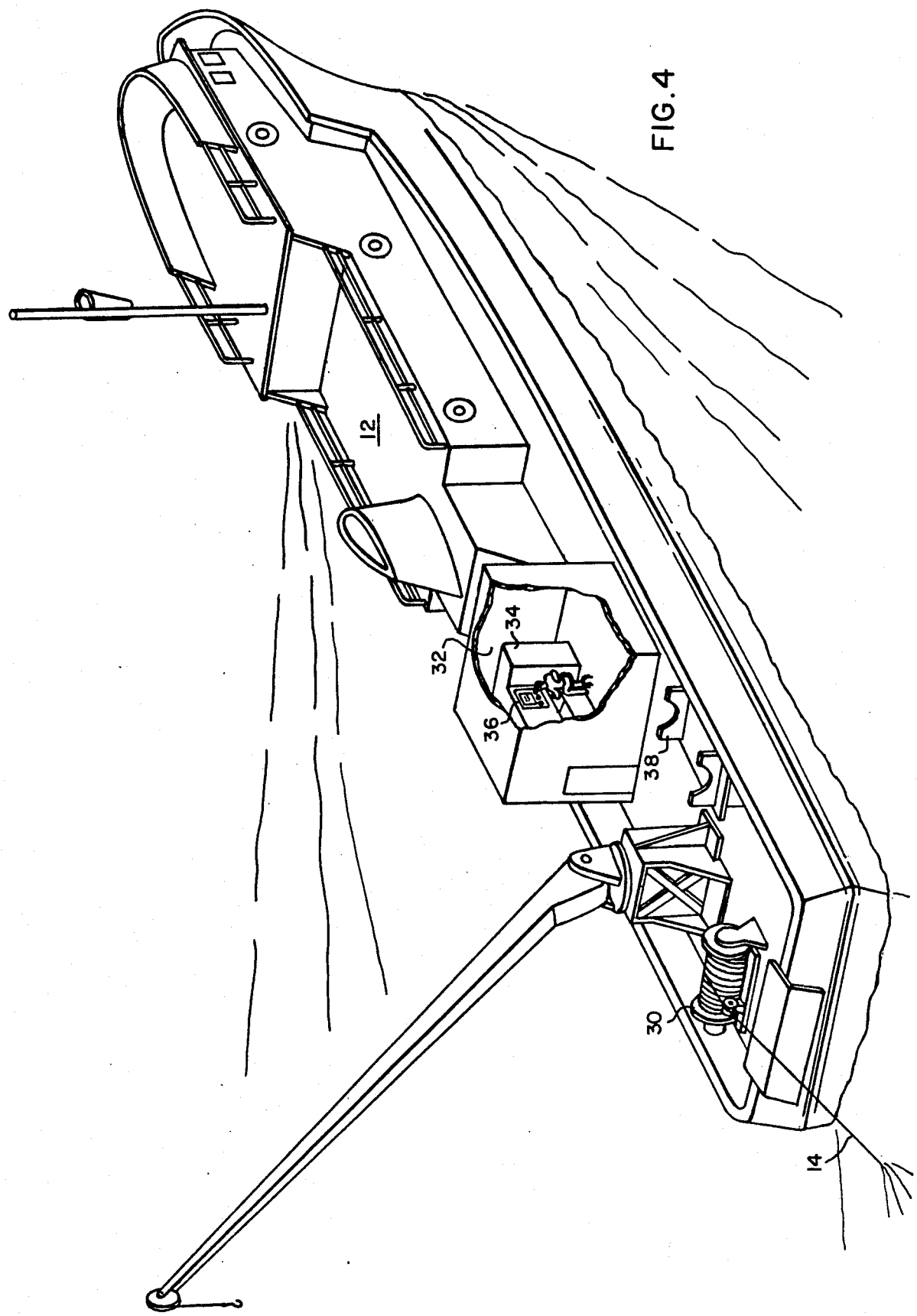

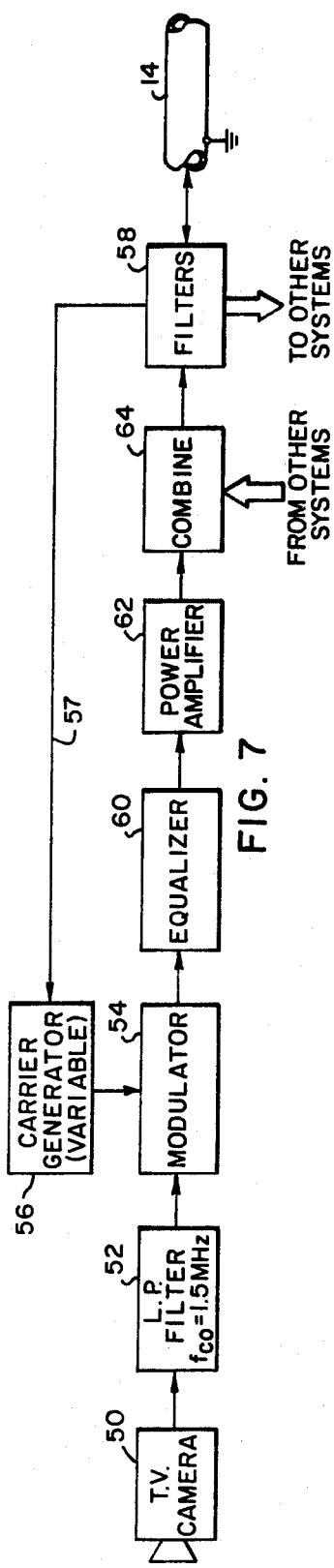
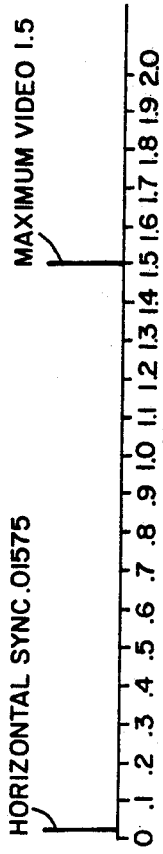
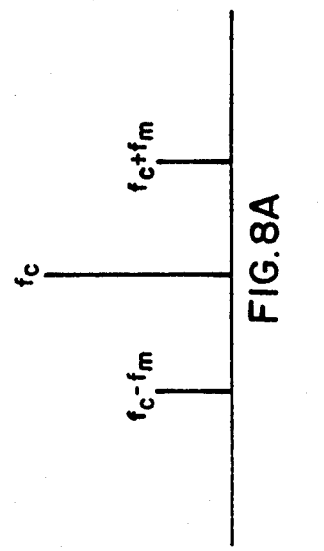
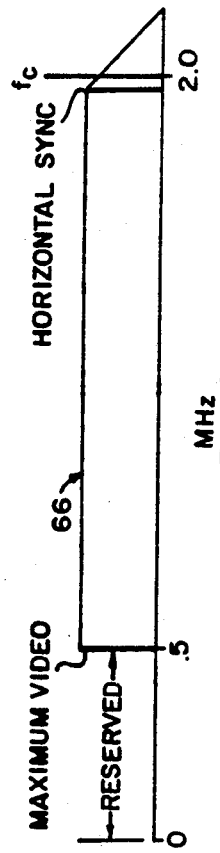

TV TRANSMISSION SYSTEM FOR LONG TOW CABLES

BACKGROUND OF THE INVENTION

1. Field of the Invention

The invention in general relates to transmission of TV signals, and particularly to the transmission of such signals over long electromechanical cables.

2. Description of the Prior Art

In one type of underwater survey system, an underwater carrier vehicle is towed over the sea bottom by means of a long electromechanical cable connected to a surface towing vessel. The carrier vehicle includes a variety of sensor systems each of which must transmit their respective signals up the cable to a receiving location from which command and control signals are transmitted down the cable to the various systems.

For various mechanical reasons, some systems require a tow cable of several ten thousands of feet, whose frequency response is considerably worse than other cables not requiring the stringent mechanical performance. With the mechanically preferred cable, transmission of TV signals directly up the cable is impossible due to the severe attenuation of the long cable and to the fact that the frequency spectrum for the TV signals is limited due to the frequency band reserved for the other sensor systems. In addition, during the checkout phase of the equipment prior to carrier development, where the carrier is located close to or on the towing vessel there is an unavoidable signal leak-through problem which tends to increase with frequency, and which causes a severe degradation of the TV picture displayed on the monitor at the receiver location. This problem is even more severe during initial checkout at the factory where the electrical components are powered from a common 110 volt distribution source.

SUMMARY OF THE INVENTION

The present invention tends to minimize the problems associated with such survey systems. Means are provided at the transmitter location aboard the vehicle to be towed, for supplying a carrier signal. A TV camera arrangement provides video signals which are modulated onto the carrier signal for transmission, along with other signals, through the tow cable to the receiver location. Means are provided at the receiver location for remotely controlling the frequency of the carrier signal. This selective control of the carrier signal from a location electrically remote from the modulation process significantly improves the picture quality of the TV picture displayed on a monitor.

In one type of survey system, two TV cameras are utilized and the present invention allows display of both TV pictures on separate monitors by transmission of only one field per frame from each camera and then displaying that respective field two times per frame on the monitor.

BRIEF DESCRIPTION OF THE DRAWINGS

FIG. 3 is a curve illustrating the electrical performance of the cable in terms of attenuation with respect to frequency;

FIG. 4 is a further view of the towing vessel illustrating a receiver station on board;

FIGS. 5A and 5B are waveforms illustrating the problem of signal leak-through;

FIG. 6 is a view of a TV monitor at the receiver station illustrating the effect of signal leak-through on the picture;

FIG. 7 is a block diagram of one embodiment of the transmitter portion of the present invention;

FIGS. 8A, 8B and 8C serve to illustrate the modulation of certain signals;

DESCRIPTION OF THE PREFERRED EMBODIMENT

Figure 1:
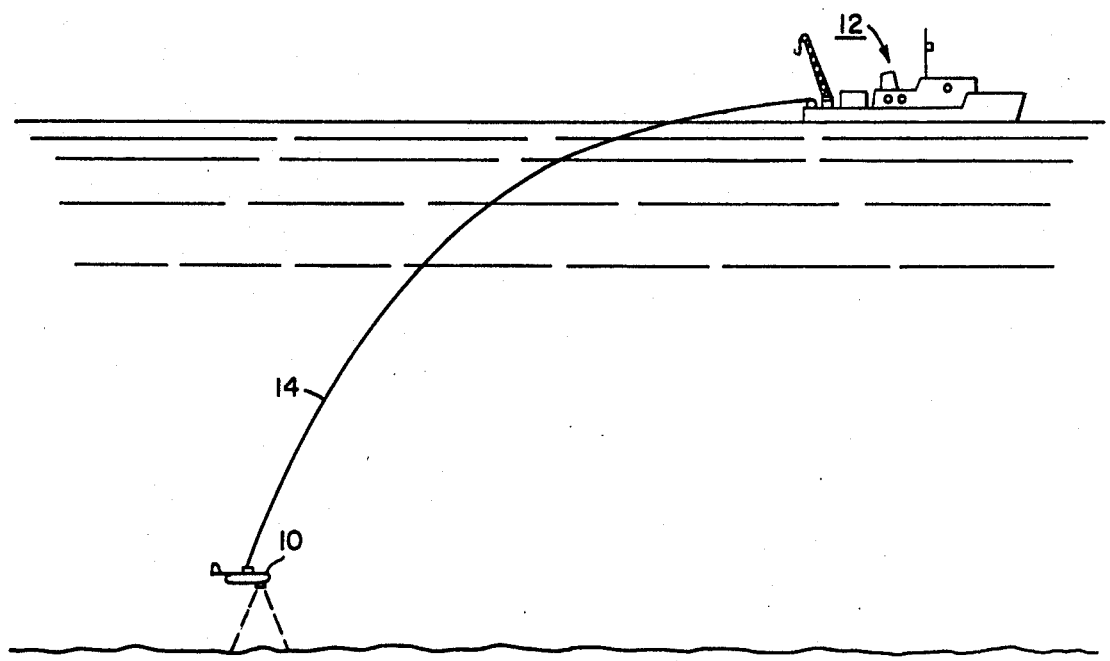
FIG. 1 illustrates a carrier vehicle of a survey system being towed by a surface vessel.

In FIG. 1 there is illustrated an underwater carrier vehicle 10 being towed by a surface vessel 12 by means of an electromechanical tow cable 14. In a typical survey system, the carrier vehicle may include various sensor systems such as altitude sonar, navigation sonar, sub-bottom profiler, obstacle avoidance sonar, side looking sonar, and film and TV cameras. In addition to these sensor systems, the vehicle may also include propulsion apparatus, lighting equipment and some form of manipulator arm. FIG. 1 is not drawn to scale, and for deep ocean work the tow cable 14 may be in the order of 30,000 feet. The cable must be capable of not only withstanding the high mechanical forces involved, but it must also be capable of transmitting electrical signals.

Figure 2:
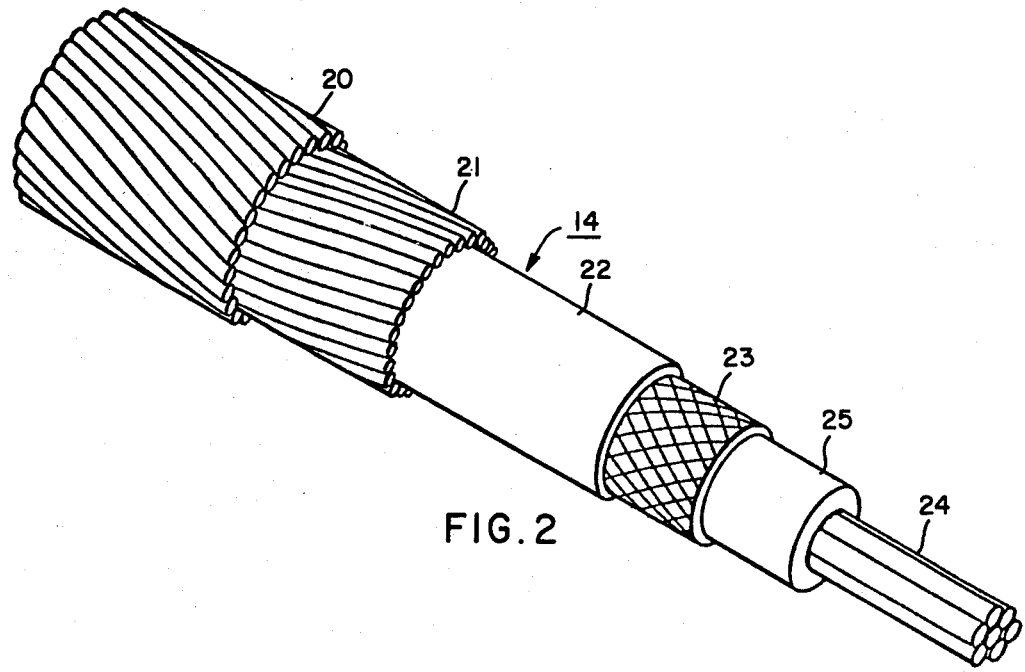
FIG. 2 illustrates a typical electromechanical tow cable construction.

FIG. 2 illustrates a typical cable 14 and it is seen to include an outer armor section 20 made up of a plurality of wires, a similar but relatively skewed inner armor section 21, a jacket 22 such as polyethylene, a copper braided outer conductor 23 and a center conductor arrangement 24 separated from the outer conductor 23 by means of a polyethylene dielectric 25.

As illustrated in FIG. 3, high frequency electrical signals are selectively attenuated by a 30,000 foot length of such tow cable. In FIG. 3 frequency in megahertz is plotted (logarithmically) on the horizontal axis and attenuation in decibels (dB) is plotted on the vertical axis. As seen from the curve, the attenuation of 1 megahertz signals is about $-50$ dB while the attenuation of 2 megahertz signals is around $-80$ dB. Generally in such systems frequency shaping networks called equalizers are placed at one or both ends of the cable to improve its frequency response.

In FIG. 4, the surface vessel 12 is seen to include a drum 30 upon which the cable 14 is wound and from which it is deployed. Signals transmitted up the cable 14 are received in a control station 32 electrically connected to the receiving end of the cable, and command and control signals to various sensor systems and other apparatus on board the carrier vehicle emanate from this control station. The control station may include a control console 34 with a TV monitor 36 for displaying the video signals transmitted up the cable from the TV camera on the underwater carrier vehicle.

One requirement in the use of such a system is the necessity for a pre-launch checkout of the various sensor systems including the TV camera. With the carrier vehicle on board in holder 38, the TV camera may be focused upon a target and the signal transmitted 30,000 feet along the cable to the console 34. With such arrangement there is an unavoidable signal leak-through from the transmitter location directly to the receiver location. The video signal transmitted along the cable does not arrive at the receiver location at the same time as the leaked signal does due to the signal delay through the cable, which may be in the order of 47 microseconds. The horizontal sync signal suffers most by interference from leak-through because, as will be explained, the modulation technique utilized places the horizontal sync signal at the maximum frequency of the transmitted band and the problem manifests itself by a degraded picture on the monitor which shows a vertical band across the picture. The problem is even more severe during initial checkout of the equipment at the manufacturing plant where both the transmitting location and receiving location receive their power from a common power line.

The waveforms of FIGS. 5A and 5B serve to illustrate the problem. The waveform of FIG. 5A represents the horizontal sync pulses, three of which S1, S2 and S3, are labeled. By way of example, the TV system may be of the type which has a 525 line standard with a two field per frame interlace (1/30 sec. per frame) with a horizontal line time of 63.5 microseconds, 10 microseconds of which may be used for blanking so that the active line displayed on the TV monitor is 53.5 microseconds.

The sync waveform of FIG. 5A is provided by the TV camera on the carrier vehicle at the transmitter location and the waveform of FIG. 5B represents the sync waveform after transmission up the cable to the receiver location. The received sync pulses are correspondingly labeled with primed reference characters and it is seen that, due to the long cable length, the transmitted waveform is delayed by a certain amount $\tau$.

When the carrier vehicle is relatively close to the receiver at the control station, such as during initial checkout or early deployment, there is an unavoidable leak-through of the video signal. Because of the large signal attenuation of the cable, the finite leak-through, although normally small, becomes significant with respect to the signal transmitted along the cable directly. The modulation scheme uses the lower sideband for signal transmission. This means that the horizontal synch signal is located close to the carrier, and because it is now the highest component in frequency of the transmitted signal and also because of the frequency amplitude compensation, the sync signal provides the greatest source of signal cross coupling. With respect to the sync signal, pulse S2 provided by the TV camera is coupled to the receiver so that the sync waveform at the receiver is affected by this leak-through signal. This is illustrated in the waveform of FIG. 5B by the interference signal I2 (due to sync pulse S2) occurring shortly after sync pulse S1', the delayed S1 sync pulse. Sync pulse S3 from the transmitter causes the interference signal I3 shortly after sync pulse S2', the delayed S1 synch pulse and the interference continues such that, as illustrated in FIG. 6, a vertical band 40 appears on the screen of the monitor 36 and masks the picture. The position of the vertical band 40 is dependent upon the time difference between a sync pulse, such as S1' and an interference pulse such as I2. For clarity the video information signal which would be superimposed upon the sync signal waveform is not illustrated.

FIG. 7 is a block diagram of transmitter apparatus for transmitting video signals up the cable and which minimizes the objectionable interference on the TV monitor. The output of TV camera 50 is a video signal occupying a frequency spectrum from about 60 Hertz to approximately 4.2 megahertz. For the system utilized herein the upper frequency is cut off at about 1.5 megahertz by low pass filter 52 and the resulting signal is provided to modulator 54 which modulates the video signal onto a carrier signal provided by carrier generator 56. Such modulation technique per se is often used for transmitting video signals up a tow cable. Because the high frequency content of the video picture is of paramount importance, the lower sideband of the modulator output is used. In the present invention the carrier generator signal is variable and is remotely controlled by means of control signals on line 57, emanating from the receiver location by a command transmitted down the cable 14 and sorted out by filter network 58, which also functions to sort out other command signals to the other systems carried by the underwater vehicle, such filter network being well known to those skilled in the multiplexing art.

In order to improve upon the cable characteristics, by frequency shaping, a frequency shaping network in the form of equalizer 60 is provided. The output thereof is amplified in power amplifier 62 and is combined with signals from the other sensors in combine circuit 64 for transmission up the cable 14. The modulation technique utilized herein is further illustrated by means of FIGS. 8A–8C, to which reference is now made.

Let it be assumed that a carrier signal has a frequency of $f_c$ and the modulating signal has a frequency of $f_m$. FIG. 8A illustrates the result of the modulation process and it is seen that there is provided not only the carrier signal $f_c$ but two sideband signals $f_c - f_m$ and $f_c + f_m$.

FIG. 8B illustrates the frequency range of the video signals to be transmitted. By virtue of the low pass filter 52, the maximum video signal appears at 1.5 megahertz while the horizontal sync signal appears at 0.01575 megahertz (15.75 kilohertz).

Let it be assumed that the nominally correct carrier frequency provided by carrier generator 56 is 2 megahertz. FIG. 8C illustrates the result of the modulation. With the carrier frequency $f_c$ chosen to be 2 megahertz, the previously lower frequency horizontal sync signal now appears at 1.9842 megahertz, very close to the carrier frequency, and the maximum TV video frequency is now located at 0.5 megahertz. The frequency spectrum below 0.5 megahertz is reserved for control and data signals of the other on board systems at the transmitter location. Although the modulation process produces an upper sideband, this upper sideband is supressed such that the vestigial sideband 66 illustrated in FIG. 8C is transmitted up the cable.

Figure 9:
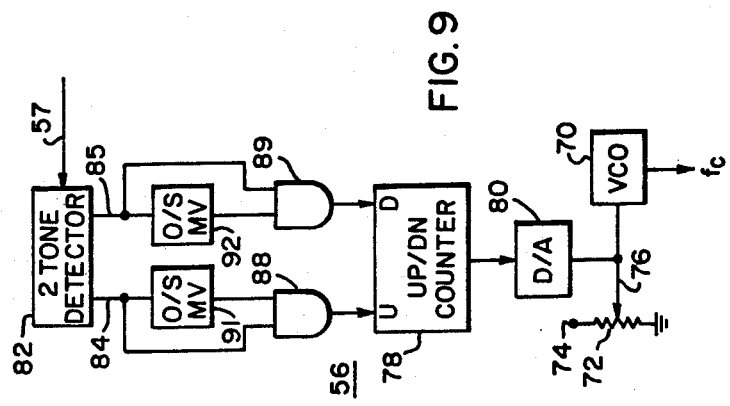
FIG. 9 is a block diagram illustrating the carrier generator of FIG. 7 in more detail.

FIG. 9 illustrates one form of carrier generator which may be utilized herein. The carrier signal designated $f_c$ is provided by a voltage controlled oscillator 70 which is initially set to provide a nominal center frequency for the carrier control by means of a bias arrangement including a voltage divider 72 which is connected to a source of constant potential (not shown) at point 74. A bias tap 76 is then adjusted to provide the desired output frequency. If the bias voltage on the VCO is varied, the VCO frequency will vary accordingly.

In the present invention the carrier frequency is varied by an operator in the control station and the control may be effected in various ways, one of which is illustrated in FIG. 9. The arrangement includes an up/down counter 78 of the digital type which provides its output count signal to a digital-to-analog converter 80, the output signal of which varies the bias on VCO 70, and accordingly its output frequency. The command to increment or decrement the up/down counter 78 is received on line 57 and may be in the form of a tonal signal with a first tone signal being indicative of an up count and a second tone signal being indicative of a down count. An input means in the form of two tone detector circuit 82 detects which tone is being received on line 57 and provides a corresponding output control signal on either line 84 or 85, with an output signal on line 84 being utilized to increment the counter and a signal on line 85 being utilized to decrement the counter.

In order to prevent chatter and multiple increments and decrements with a single tone signal, the arrangement includes AND gates 88 and 89 which receive the respective output signals on lines 84 and 85, and in addition each receives a respective output signal from one shot multi-vibrators 91 and 92. These multi-vibrators receive the tone signals on respective output lines 84 and 85 and generate a clean one shot pulse which is utilized to gate a respective AND gate 88 or 89.

In operation, if the display picture on the monitor in the control station is satisfactory no adjustment to the output frequency of VCO 70 need be made. If the picture is unsatisfactory, the operator may command either an increase or a decrease in the operating carrier frequency in certain predetermined increments by selective activation of a tone generator at the control console. Repetitive activation will change the frequency in the predetermined increments and may be terminated when the display picture improves in quality.

The operation of the apparatus may be explained with reference to the vector diagram of FIG. 10A which shows the relationship between the wanted and unwanted signals. The wanted signal is represented by vector W while the unwanted signal is represented by vector UW and the relative phase angle between the two vectors is designated $\theta$. The result of vectorially combining the two quantities W and UW is illustrated by the vector R and if the resultant signal R is equal in amplitude to the wanted signal W, there is effectively no amplitude change in the wanted signal caused by the unwanted signal and the distortion on the display is minimized. The angle $\theta$ is very sensitive to frequency change. That is, if the frequency of the carrier is varied, it has a great effect on the phase angle of the unwanted signal. In the present invention by varying the frequency of the carrier $f_c$ the phase angle $\theta$ is correspondingly changed. If the ratio of the unwanted to wanted signal is K, then there exists a phase angle $\theta$ where the resultant and the wanted signal have the same amplitude. This occurs when $\theta$ equals $\cosine^{-1}(K/2)$. If this condition is not met, there is an amplitude change in the wanted signal caused by the unwanted signal which has two effects on the displayed picture, a gray vertical band on the display and/or poor sync. By way of example, let it be assumed that the magnitude of vector W is unity and the magnitude of vector UW is 0.2. With the phase angle $\theta$ equal to 81°, the resultant vector R will be 0.988 or only 1.2% lower than the desired signal.

Figure 10B:
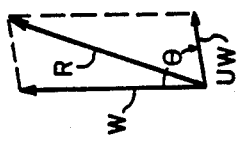
FIGS. 10A and 10B are vector diagrams illustrating the relationship between wanted and unwanted signals.
Figure 10A:
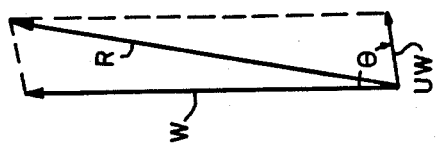

With reference to FIG. 10B, suppose the wanted signal W is of a magnitude equal to 0.5. The magnitude of the unwanted signal does not change and remains at 0.2. With the same angle $\theta$ equal to 81° the resultant signal is 0.508 or only 1.7% higher than the desired signal. In operation, with the presence of a vertical gray band on the display, the operator can vary the carrier frequency to in turn vary the angle $\theta$ to bring the resultant signal into close agreement with the desired signal to therefore minimize the effect of the unwanted signal. Obviously there are an infinite number of vector diagrams for all the transmission frequencies from the sync down to 0.5 megahertz, however because the coupling is worse at the maximum frequency (synch), and because it provides a fixed background vertical stripe, its effect on the resultant display is the most objectionable, and therefore only the vector diagram associated with the sync waveform is discussed.

Because of the necessary close spacing of the maximum modulation frequency (the horizontal sync frequency in FIG. 8C) and the frequency of the carrier, there may occur best frequencies between these two signals which results in vertical striping on the displayed picture. With the provision of the variable carrier frequency, the beat frequency may be varied when the survey vessel is deployed so as to reduce the possibility of cross-hatching or vertical striping on the display.

Figure 11:
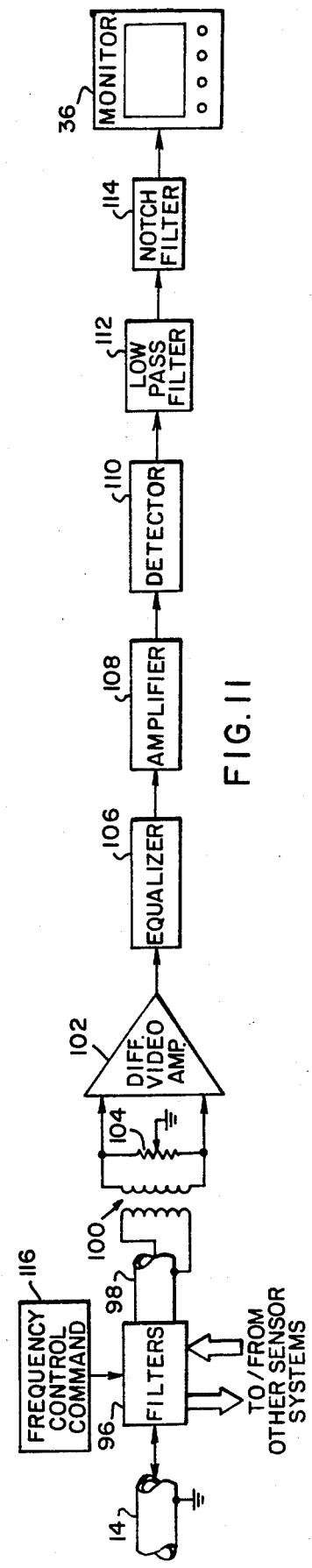
FIG. 11 is a block diagram of one embodiment of the receiver portion of the present invention.

FIG. 11 illustrates the receiver portion of the apparatus. After separation of the up and down going signals from and to the other sensors, by filter network 96, the video signal is provided, via coaxial cable 98 to a differential input transformer 100 connected to the input of differential video amplifier 102. A balancing register 104 is provided across the secondary winding of the differential input transformer 100. Equalizer circuit 106 receives the output amplified video signal from the amplifier 102 and provides frequency shaping, as did the equalizer at the transmitter portion. The video signal is further amplified in amplifier 108 and is detected in detector 110 and passed through a low pass filter 112 to recover the modulation signal. A very narrow band notch filter 114 is inserted in circuit to further suppress the carrier signal. The detected video signal is then provided to monitor 36 for viewing.

In response to the displayed picture, the operator at the control console may remotely vary the carrier frequency by means of frequency control command circuit 116 which in response to the operator selection may transmit either a first tone signal or a second tone signal to vary the frequency, as was described with respect to FIG. 9. One embodiment of a frequency control command circuit which may be utilized herein is illustrated in FIG. 12 to which reference is now made.

Figure 12:
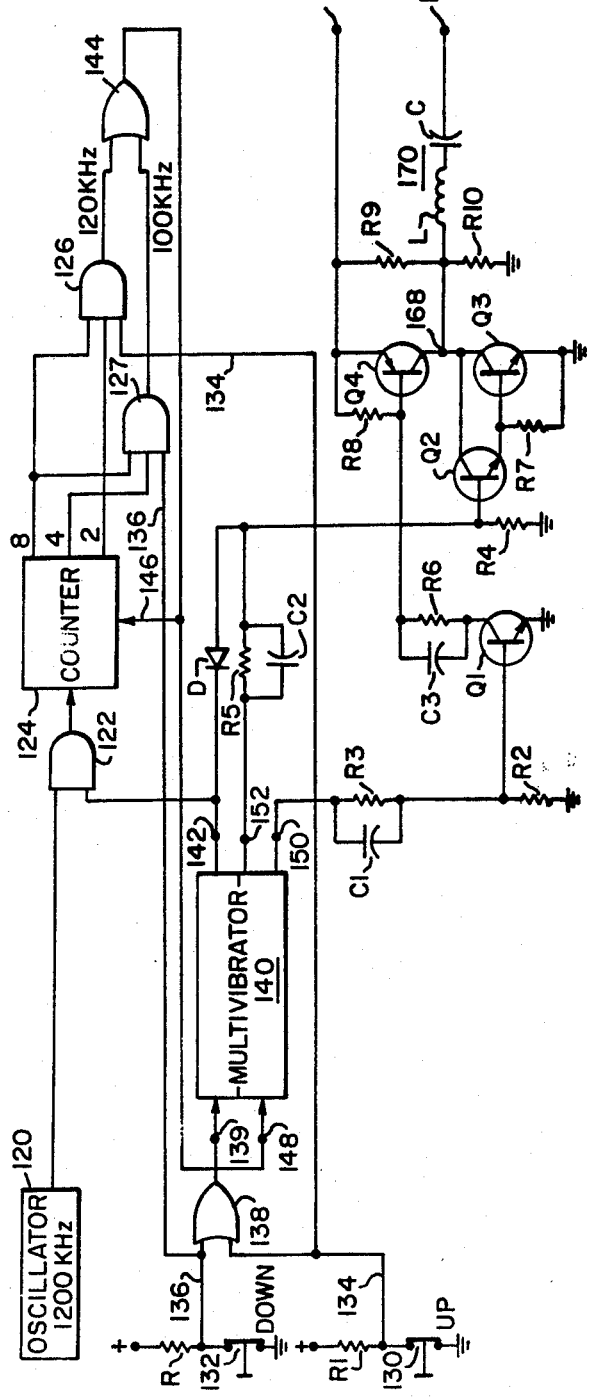
FIG. 12 is a block diagram illustrating the frequency control command unit of FIG. 11 in more detail.

The frequency control command circuit 116 illustrated in FIG. 12 utilizes primarily digital circuitry (except for the output stage) to generate first and second tone, or command signals. The circuitry includes an oscillator 120 which provides its output signal to AND gate 122 which, when enabled, will pass the oscillator output pulses through to counter 124.

The inputs to AND gates 126 and 127 are connected to selected stages of counter 124 such that AND gate 126 will provide an output signal at the count of 10, if it is enabled, and AND gate 127 will provide an output signal at the count of 12, if it is enabled. If the oscillator frequency is, for example, 1,200 kilohertz, an enabled AND gate 126 will provide a first frequency signal of 120 kilohertz and an enabled AND gate 127 will provide a second frequency signal of 100 kilohertz. The 120 kilohertz signal may represent a command to increase the frequency of the carrier generator whereas the 100 kilohertz signal may represent a command to decrease the frequency of the carrier generator.

Selective enabling of AND gates 126 or 127 is accomplished by an operator by means of either up push button 130 or down push button 132. When push buttons 130 and 132 are in the deactivated condition, line 134 connected to the third input of AND gate 126 and line 136 connected to the third input of AND gate 127, are connected to ground potential through the respective push buttons 130 and 132 such that no enabling signal is provided to either of the AND gates. Each of the push buttons is connected to a source of positive potential through respective resistors R and R1 such that if push button 130 is activated the connection to ground is broken and line 134 will be connected to the positive potential source. Alternatively, if push button 132 is activated line 136 will be connected to the source of positive potential.

Since line 134 is connected to AND gate 126, it will be enabled upon activation of push button 130 whereas AND gate 127 will be enabled by activation of push button 132. In either case activation of one of the push buttons provides a signal to OR gate 138 which will pass the signal through to input terminal 139 of one-half of a dual multi-vibrator 140. As a result of this activation, an enabling output signal of predetermined duration will be provided at output terminal 142 of the multi-vibrator, which output signal then enables AND gate 122 so that the counting process may commence.

OR gate 144 passes either the pulses at a frequency of 120 kilohertz, from AND gate 126, or the pulses at a frequency of 100 kilohertz from AND gate 127. Each pulse of the signal passed by OR gate 144 resets, via line 146, counter 124 back to 0 and is also applied to input terminal 148 of the second half of dual multi-vibrator 140. In response to an input signal at input terminal 148 corresponding complementary positive going and negative going signals are provided at output terminals 150 and 152.

Figure 12A:
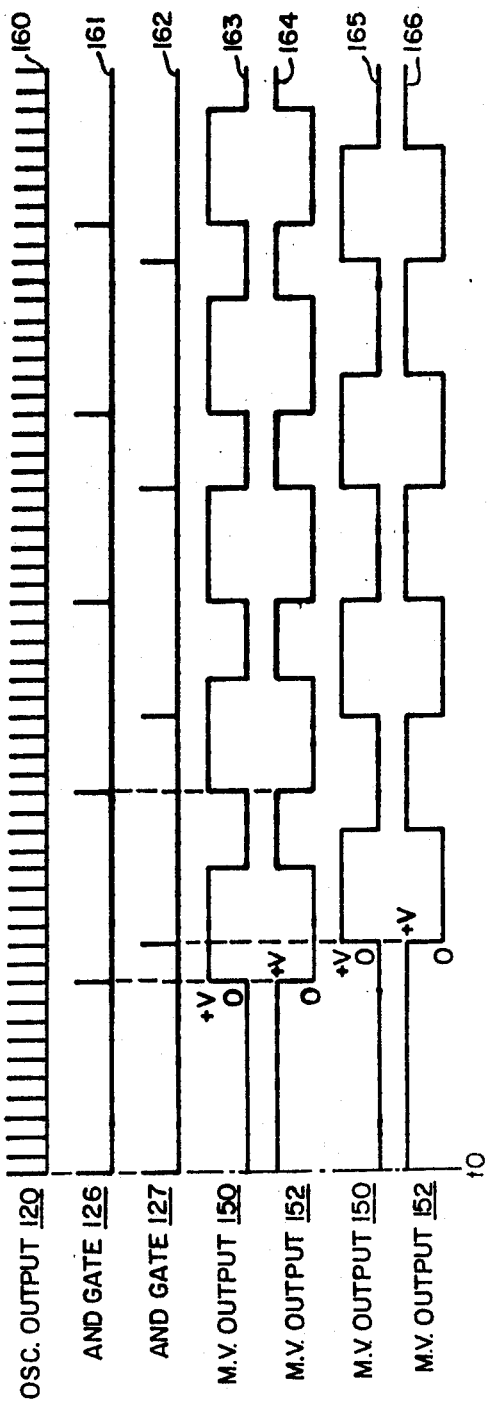
FIG. 12A shows waveforms appearing at various points in the circuit of FIG. 11.

With additional reference to FIG. 12A, waveform 160 represents the output of oscillator 120 whereas waveforms 161 and 162 represent the outputs of AND gates 126 and 127 respectively (when respectively enabled). Let it be assumed that AND gate 126 is enabled. In response to each pulse of the waveform 161 applied to input terminal 148, multi-vibrator 140 will provide an output signal 163 at output terminal 150 and an output signal 164 at output terminal 152. Waveform 163 goes from approximately ground potential to a positive potential +V upon each input trigger and will remain at the elevated voltage for a period of time governed by the multi-vibrator circuitry. For example, such time may be in the order of 5 microseconds. Concurrently therewith, the output signal at output terminal 152 goes from the relatively positive voltage +V to substantially ground potential and then returns to the positive potential after the 5 microsecond duration. (In comparison with the approximately 5 microsecond positive going and negative going pulses provided at output terminals 150 and 152, the enabling output pulse provided at output terminal 142 of multi-vibrator 140 may be in the order of 20 milliseconds.)

Waveforms 165 and 166 represent the output signals at output terminals 150 and 152 in respose to the trigger pulses of waveform 162.

Referring once again to FIG. 12, circuit means are provided to be responsive to the output signals from the multi-vibrator to generate a substantially sinusoidal tone signal for transmission down the cable to the carrier generator for varying its carrier frequency. The circuit means includes a plurality of transistors Q1 to Q4 with the output signal from output terminal 150 being coupled to transistor Q1 by means of voltage divider network including resistor R2 and the parallel arrangement of resistor R3 and C1. Similarly, the output signal from output terminal 152 is coupled to transistor Q2 by means of a voltage divider network including resistor R4 and the parallel arrangement of resistor R5 and capacitor C2. The signal at the collector of transistor Q1 is coupled to transistor Q4 by means of the parallel arrangement of R6 and C3. Transistor Q3 is connected in a Darlington configuration with transistor Q2 and has its collector connected to the collector of transistor Q4 with transistors Q3 and Q4 each having a respective base-to-emitter resistor R7 and R8.

An output circuit includes a voltage divider network comprised of resistors R9 and R10 with the junction between them being connected to the collectors of transistors Q3 and Q4 at junction point 168 and also to an output tuned circuit 170 including inductor L and capacitor C. Operating potential is supplied to the transistor arrangement by means of a voltage applied to bias terminal 172 and the output of circuit 116 is derived from output terminal 174.

In operation, after one of the push buttons has been activated, the positive going pulse at output terminal 150 will turn on NPN transistor Q1 which in turn will turn on PNP transistor Q4. The negative going pulse at output terminal 152 ensures that NPN transistor Q2 and therefore NPN transistor Q3 remain in an off condition. The collector of Q3 before rises to a potential close to that of terminal 172. When the multi-vibrator output pulses revert to their opposite state, transistor Q1 turns off, turning off transistor Q4 while transistors Q2 and Q3 turn on. With the turning on of transistors Q2 and Q3, the voltage at point 168, previously close to the supply voltage, reverts to substantially ground voltage. It is therefore seen that with the output pulse provided by the second half of multi-vibrator 140, a rectangul wave signal is generated at the junction of resistors R9 and R10. The rectangular wave signal has a frequency depending upon which of the push buttons 130 or 132 was activated.

The function of the tuned circuit is to convert the rectangular wave produced at the junction of resistors R9 and R10 into a sinusoidal wave for transmission down the cable. Since two possible frequencies may be transmitted (either 100 kilohertz or 120 kilohert) circuit 170 may betuned to the average of these two frequencies, or 110 kilohertz. The resulting signal at output terminal 174 will be substatially sinusoidal and somewhat asymmetrical but will be readily detectable by the filtering of two tone detector 82 (FIG. 9).

On an overall time scale, even if a push button were activated for only 1/5 of a second, an enabling signal would be provided to either AND gate 126 or 127 for 200 milliseconds, ten times longer than the enabling signal provided at output terminal 142 to AND gate 122. Only 20 milliseconds of signal is permitted to pass down the cable because the excess of pulse length greater than 20 milliseconds achieves no purpose and can cause unnecessary heating of the output transistors Q3 and Q4.

Due to the fact that output terminal 174 is connected for transmission of signals down the cable and due to the fact that other telemetry signals exist in the system it is most important that the frequency control command circuit 116 not influence the other telemetry channels. In other words, when the frequency control command 116 is not operating, it must not act as a load for other signals. Circuit 116 could act as a load to other signals appearing at terminal 174 if transistors Q2 and Q3 remain in an on condition. During operation the output signal at output terminal 152 of multi-vibragtor 140 reverts to a positive voltage which, when applied to the base of transistor Q2, turns it on. At the conclusion of the enabling pulse provided at output terminal 142 of multi-vibrator 140, it is conceivable that transistor Q2 (and therefore Q3) will remain in an on condition and offer a path to ground for any signals appearing at terminal 174. In order to obviate this potential problem, means are provided for insuring that output terminal 174 becomes an open circuit when the enabling signal at terminal 142 is no longer provided. This may be accomplished with the provision of diodes D having its cathode connected to terminal 142 and its anode connected to the base of transistor Q2. When an enabling signal is being provided at terminal 142, a positive voltage is applied to the cathode of the diode D, which therefore remains in a non-conducting condition. When the enabling signal is terminated at terminal 142, the voltage thereat assumes ground potential allowing conduction of diode D thereby placing the base of transistor Q2 at ground potential to insure its non-conduction.

Due to the tow cable restrictions, normally only one real time TV picture can be transmitted up the cable and at a reduced horizontal resolution. For example, if a normally 370 horizontal lines (in the direction of the raster lines) could be resolved in the conventional TV picture, the present arrangement limits this resolution to less than 200 lines. With an aspect ratio of 3 to 4 of the displayed picture, the horizontal resolution (the number of vertical lines that can be resolved across the display) would be less than 150. Since in the example of a 525 line standard, there are approximately 480 active lines per frame, there would be more than enough lines per field to provide the $\frac{3}{4} \times 150$ lines for the 3:4 aspect ration picture. Accordingly, the present invention may additionally include means for transmitting two real time video pictures up the cable by transmitting only one field from each camera.

Figure 13:
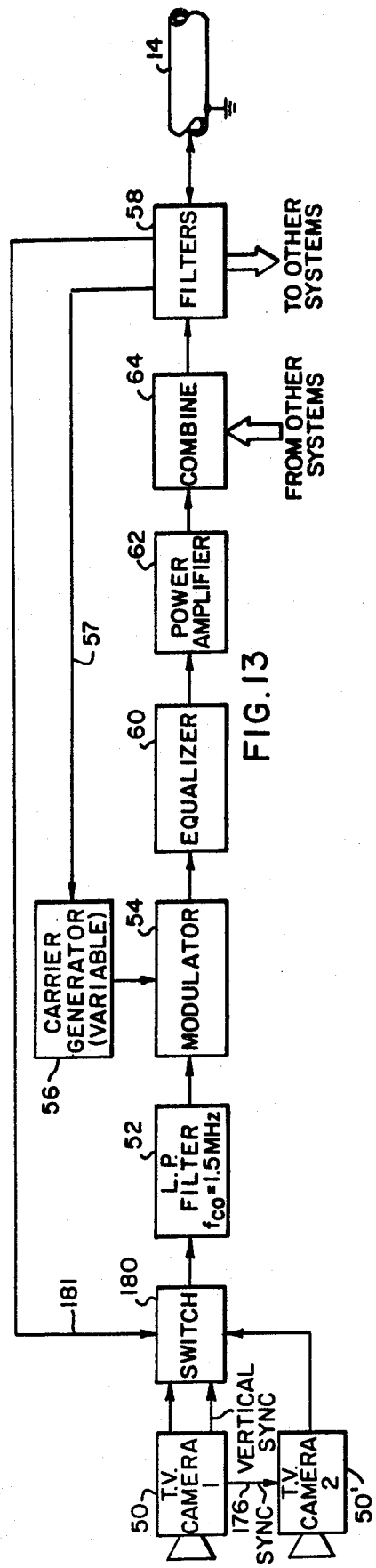
FIG. 13 illustrats an alternate embodiment of the present invention for transmitting two TV pictures.

FIG. 13 shows the apparatus at the transmitting location and circuits previously described with respect to FIG. 7 have been given the same reference numeral. FIG. 13 includes a second TV camera 50' deriving its sync signals from camera 50 via line 176 with the video signals from cameras 50 and 50' being provided to an electronic switch 180 which alternates between cameras at the field rate dictated by a vertical sync signal from camera 50, so as to alternatelty gate only one field per frame from each camera. By means of an override control signal on line 181 switch 180 may be deactivated so as to pass only signals from one of the cameras.

Figure 14:
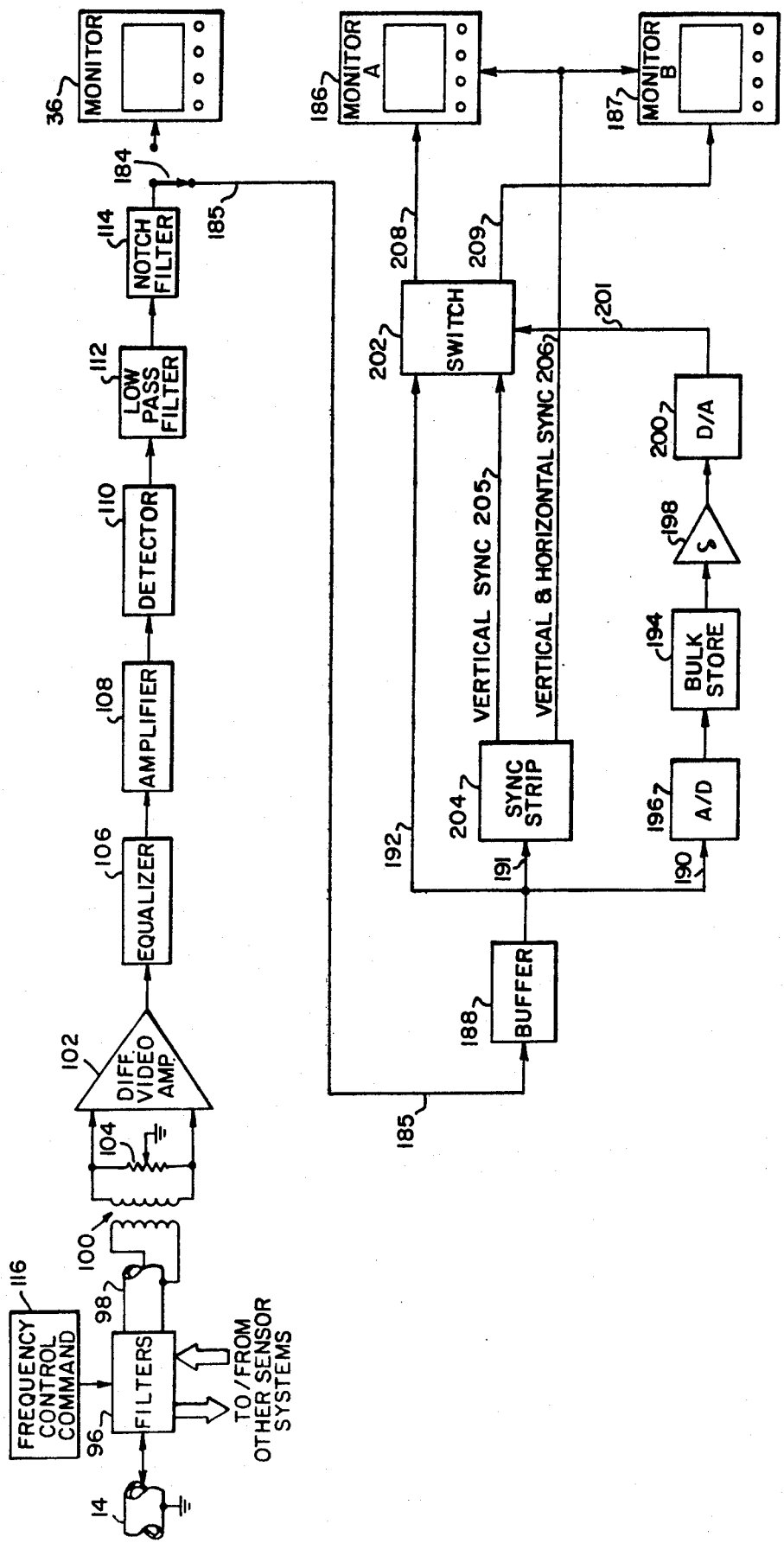
FIG. 14 is a block diagram of the receiver apparatus for displaying the signals from both TV cameras of FIG. 13.

If the video data were transmitted up the cable and presented as a one field display at a frame rate, then the displayed image will flicker. This objectionable flicker may be eliminated with the apparatus illustrated in FIG. 14 to which reference is now made. The upper portion of FIG. 14 is identical to FIG. 11 and like components are given the same reference numeral. The only exception to the similarity is the inclusion of manually operated switch 184 which, when in the position illustrated, provides the signal from notch filter 114 to line 185 instead of monitor 36.

Basically, the technique for displaying two flickerless TV picture includes TV monitors 186 and 187, designated monitor A and B respectively, and further includes storage means for storing the information from one TV field. The apparatus is operated such that the same information is displayed twice per frame. To accomplish this operation, buffer circuit 188 receives the TV signal on line 185 and provides it as an output on three lines 190, 191 and 192. The signal on line 190 is provided to a storage means 194 which, due to the resolution of the picture, need be only about $\frac{1}{8}$ the complexity and size of a normal full TV solid state storage. If the storage means is of the digital type, then an analog to digital converter 196 may be provided to convert the signal to digital format prior to storage.

When the information comes out of storage, it is delayed by $\frac{1}{2}$ TV line by means of delay circuit 198, is converted back into analog form by digital-to-analog converter 200 and is provided, on line 201, to a switching circuit 202.

The video signal from buffer 188 is provided, on line 191, to a sync stripping circuit 204 which provides a vertical sync signal on line 205 to switching circuit 202 and provides the vertical and horizontal sync signals on line 206 to monitors 186 and 187.

Figure 15:
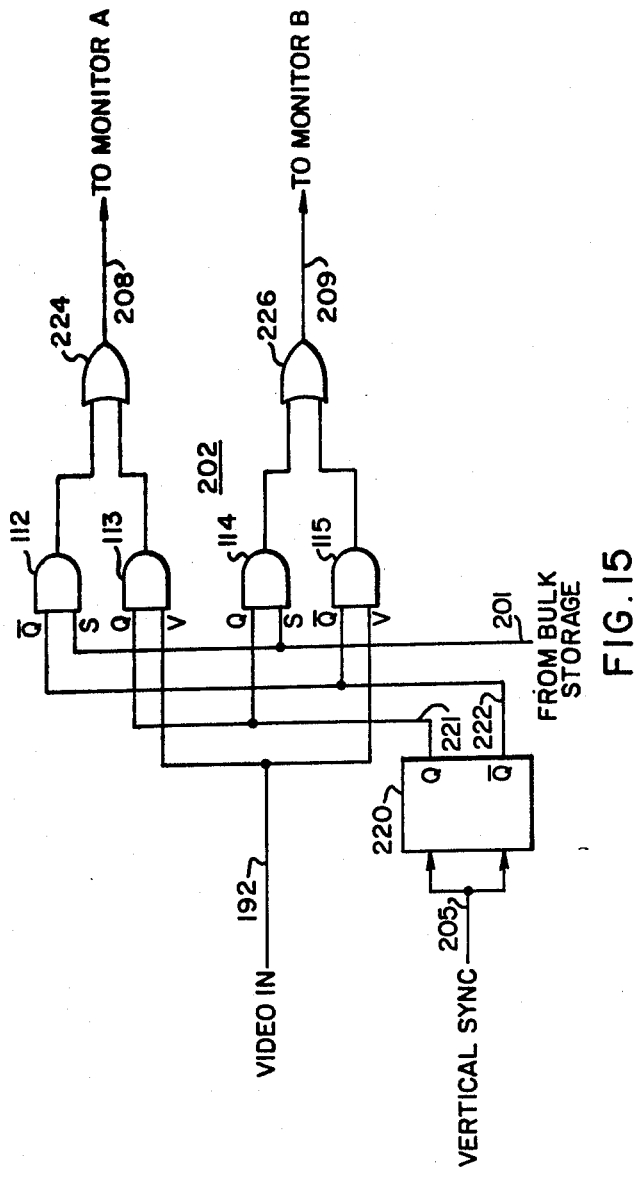
FIG. 15 illustrates the electronic switch of FIG. 14 in more detail.

Switching circuit 202 additionally receives the video signal on line 192 and is operable to provide video output signals on lines 208 and 209 to monitors 186 and 187, respectively. Each monitor would then alternately receive a live field transmitted up the tow cable followed by the same data represented from the storage means. A switching circuit to accomplish this operation is illustrated in FIG. 15.

The switching circuit includes a plurality of AND gates 112 to 115 with the video signal on line 192 being provided to AND gates 113 and 115 while the signal coming from the storage means is provided, on line 201, to AND gates 112 and 114.

A toggle flip-flop 220 receives the vertical sync pulses on line 205 to provide alternate output signals on lines 221 and 222 in response thereto. An output on line 221 will enable AND gates 113 and 114 while an output on line 222 will enable AND gates 112 and 115.

For purposes of illustration let it be assumed that a sync pulse on line 205 has caused line 221 to provide its enabling output signal. In such instance AND gate 113 will pass the video signal through to monitor A via OR gate 224 and line 208. Simultaneously therewith, the enabled AND gate 114 will pass the one field delayed signal from the storage through to monitor B via OR gate 226 and line 209. While this is happening, the video signal being displayed on monitor A is also being placed into storage 194 (FIG. 14). Upon the occurrence of the next vertical sync pulse on line 205 indicating the arrival of a next field from the other TV camera, flip-flop 220 will switch its enabling signal to line 222 such that AND gate 112 will pass the stored field (the one that was just delayed on that same monitor A) while AND gate 115 will pass the video signal from the other camera, which signal is concurrently being placed into storage so that upon the occurrence of the next vertical sync the stored signal will be displayed on monitor B. It is seen therefore that each monitor alternately has a live field from a respective TV camera with the live field being followed by that same field from storage. The ½ TV line delay insures for proper interlacing operation.

Accordingly, there has been provided a system wherein the bandwidth of the cable transmission system is effectively increased with the capability of overcoming the effects of signal leak-through that can occur under certain conditions of operation. The system carrier signal may also be remotely controlled to allow for changes in the system delay and/or attenuation which may be caused by wear of the cable necessitating a removal of small lengths from one or both ends of the cable. In addition, the system provides a dual channel capability for displaying the video from two TV cameras without changing horizontal resolution.

I claim:

1. An improved transmission system for transmitting video signals from a transmitting location to a receiving location over a long electromechanical cable, comprising:
   (A) first means, located at said transmitter location, for supplying a carrier signal;
   (B) second means, located at said transmitter location, for modulating said video signals onto said carrier signal;
   (C) third means, located at said receiver location, for remotely controlling the frequency of said carrier signal;
   (D) said first means including
      (i) input means for receiving input commands transmitted from said receiver location for providing output control signals in response thereto,
      (ii) a biased voltage controlled oscillator providing a nominal1 correct frequence, $f_c$,
      (iii) circuit means responsive to said output control signals for varying the bias of said voltage controlled oscillator to vary the output frequency thereof;
   (E) said circuit means including
      (i) an up/down counter,
      (ii) means for applying a first control signal to said counter to increment it,
      (iii) means for applying a second control signal to said counter to decrement it, and
      means connected to said counter for converting the count therein into a corresponding voltage and applying said voltage to vary said bias of said voltage controlled oscillator.

2. Apparatus according to claim 1 which includes:
   (A) a first one shot multivibrator responsive to a first control signal provided by said input means to provide a pulse output signal of predetermined duration;
   (B) a second one shot multivibrator responsive to a second control signal provided by said input means to provide a pulse output signal of predetermined duration;
   (C) a first gate for receiving said first control signal and said pulse output of said first multivibrator to provide an output to increment said counter; and
   (D) a second gate for receiving said second control signal and said pulse output of said second multivibrator to provide an output to decrement said counter.

3. Apparatus according to claim 1 wherein:
   (A) said input commands include a first tonal signal and a second tonal signal; and
   (B) said input means is a multitone detector.

4. An improved transmission system for transmitting video signals from a transmitting location to a receiving location over a long electromechanical cable, comprising:
   (A) first means, located at said transmitter location, for supplying a carrier signal;
   (B) second means, located at said transmitter location, for modulating said video signals onto said carrier signal;
   (C) third means, located at said receiver location, for remotely controlling the frequency of said carrier signal;
   (D) said third means including
      (i) an oscillator,
      (ii) means coupled to said oscillator for deriving a first frequency signal and a second frequency signal,
      (iii) an output terminal,
      (iv) means coupling said output terminal to said cable, and
      (v) operator selected means for gating and coupling either said first frequency signal or said second frequency signal to said output terminal.

5. Apparatus according to claim 4 wherein said means coupled to said oscillator includes:
   (A) a counter;
   (B) means for gating the output of said oscillator to said counter;
   (C) first and second gating means responsive to predetermined first and second counts in said counter to provide, when respectively enabled, a first pulse signal of said first frequency and a second pulse signal of said second frequency; and
   (D) means connected to said counter for resetting it upon the occurrence of each pulse of said first or second pulse signals.

6. Apparatus according to claim 5 wherein said operator selected means includes:
   (A) a first pushbutton, the activation of which provides a first enabling signal to said first gating means and
   (B) a second pushbutton, the activation of which provides a second enabling signal to said second gating means.

7. Apparatus according to claim 6 which includes:
   (A) gating means including a first multivibrator operator to provide an enabling signal of predetermined duration, and responsive to either said first or second enabling signals to enable said gating of said oscillator output.

8. Apparatus according to claim 7 which includes:
   (A) a second multivibrator of the type which provides first and second complementary output signals in response to a single input signal;
   (B) means coupling said first or second pulse signals to the input of said second multivibrator;
   (C) transistor means connected to receive said complementary output signals and in response thereto provide a rectangular wave signal;
   (D) means coupling said rectangular wave signal to said output terminal.

9. Apparatus according to claim 8 wherein:
   (A) said means coupling said rectangular wave signal to said output terminal includes a tuned circuit.

10. Apparatus according to claim 9 wherein:
(A) said tuned circuit is tuned to a frequency which is an average of said first and second frequencies.

11. An improved transmission system for transmitting video signals from first and second TV cameras at a transmitting location to a receiving location over a long electromechanical cable, comprising:
(A) first means, located at said transmitter location, for supplying a carrier signal;
(B) second means, located at said transmitter location, for modulating said video signals onto said carrier signal;
(C) third means, located at said receiver location, for remotely controlling the frequency of said carrier signal;
(D) said first and second TV cameras providing respective video signals at said transmitting location with each operating in a two field per frame interlace mode of operation;
(E) means for alternately gating only one field per frame from each said camera for cable transmission; and
(F) means for processing and displaying said alternately transmitted video signals including first and second monitors for displaying respective signals from said first and second TV cameras.

12. Apparatus according to claim 11 which includes:
(A) storage means for storing the signals of a TV field, concurrently with the display thereof on one of said monitors;
(B) means for supplying said stored field to said same monitor upon receipt of a subsequent TV field, which is displayed on the other said monitor.

* * * * *